US008625273B2

(12) United States Patent
Zhou (10) Patent No.: US 8,625,273 B2
(45) Date of Patent: Jan. 7, 2014

(54) DOCKING STATION FOR ELECTRONIC DEVICE

(75) Inventor: Cong-Bing Zhou, Shenzhen (CN)

(73) Assignees: Fu Tai Hua Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 263 days.

(21) Appl. No.: 13/210,896

(22) Filed: Aug. 16, 2011

(65) Prior Publication Data

US 2012/0188691 A1 Jul. 26, 2012

(30) Foreign Application Priority Data

Jan. 21, 2011 (CN) .......................... 2011 1 0024378

(51) Int. Cl.
*G06F 1/16* (2006.01)
(52) U.S. Cl.
USPC ..................................... 361/679.41; 439/135
(58) Field of Classification Search
USPC ................. 361/679.41, 679.01; 439/135, 131
See application file for complete search history.

(56) References Cited

U.S. PATENT DOCUMENTS

| | | | |
|---|---|---|---|
| 6,366,450 B1* | 4/2002 | Janicek .................... | 361/679.41 |
| 6,717,798 B2* | 4/2004 | Bell et al. ................. | 361/679.41 |
| 6,717,801 B1* | 4/2004 | Castell et al. ............ | 361/679.41 |
| 7,471,511 B2* | 12/2008 | Montag et al. ........... | 361/679.41 |
| 8,323,040 B2* | 12/2012 | Prest ............................. | 439/131 |
| 8,422,206 B2* | 4/2013 | Fu et al. .................... | 361/679.01 |
| 2001/0001083 A1* | 5/2001 | Helot ............................ | 439/131 |
| 2005/0287852 A1* | 12/2005 | Sugawara et al. ............. | 439/135 |
| 2006/0219857 A1* | 10/2006 | Satterfield .................. | 248/284.1 |
| 2007/0263348 A1* | 11/2007 | Rutledge et al. .............. | 361/681 |
| 2011/0157801 A1* | 6/2011 | Satterfield ................ | 361/679.01 |

* cited by examiner

*Primary Examiner* — Lisa Lea Edmonds
(74) *Attorney, Agent, or Firm* — Altis Law Group, Inc.

(57) ABSTRACT

A docking station for an electronic device includes a main body, and a connector mechanism. The main body defines a receiving space at a sidewall thereof. The connector mechanism is rotatably mounted to the main body and is capable of being received in the receiving space when in a closed position relative to the main body. The connector mechanism includes an interface for supporting the electronic device. When the connector mechanism is received in the receiving space, the interface is hidden in receiving space.

16 Claims, 7 Drawing Sheets

DOCKING STATION FOR ELECTRONIC DEVICE

BACKGROUND

1. Technical Field

The present disclosure relates to a docking station for an electronic device.

2. Description of Related Art

Portable electronic devices, such as mobile phones, often use docking stations for charging and synchronizing the electronic device. The docking station usually includes a main body and one or more interfaces (such as a USB port) projecting out of the main body. The interface can be inserted into the electronic device, whereby the electronic device is electrically connected to the docking station. When not in use the interface is exposed to dust and other contaminants which can degrade or shorten the life of the interface and hence the docking station.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the five views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
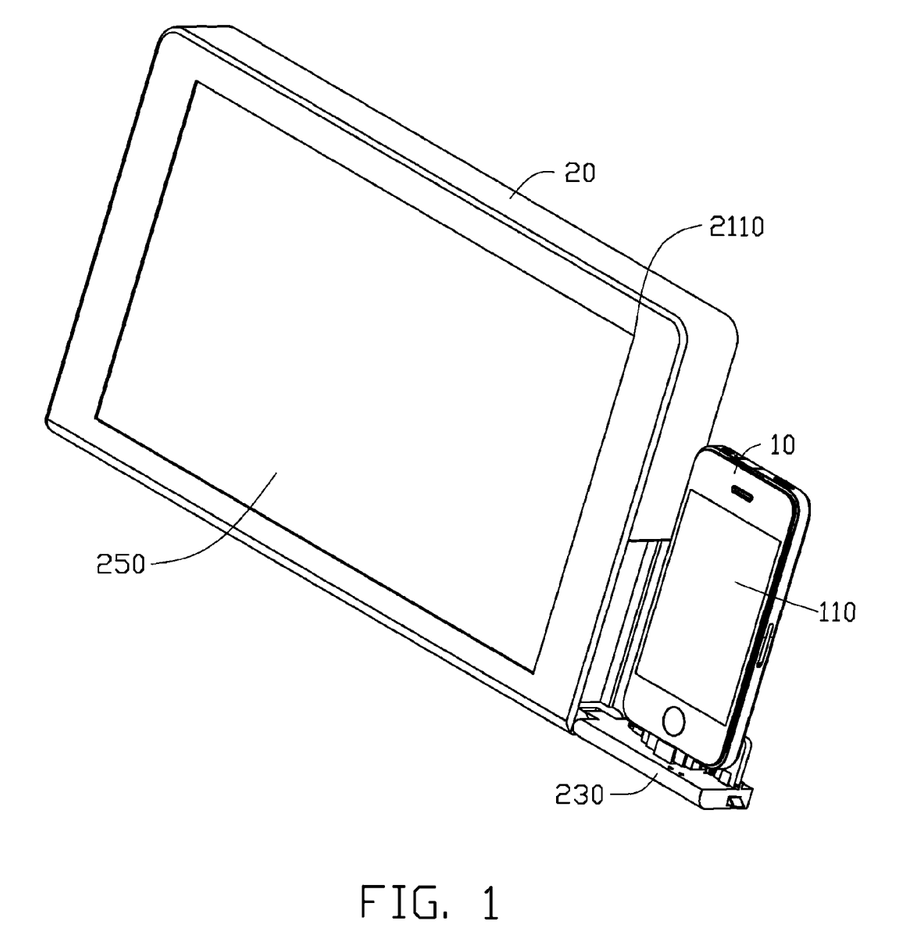
FIG. 1 is a perspective view of a docking station for an electronic device assembly in accordance with an exemplary embodiment; the docking station includes a foldable interface mechanism.

Referring to FIG. 1, an electronic device assembly including an electronic device 10 and a docking station 20 in accordance with an embodiment is shown. The electronic device 10 is a mobile phone in the embodiment. The docking station 20 is adapted to support and electrically connect to the electronic device 10. The electronic device 10 includes a first display 110 for displaying information, such as, video, pictures, and documents. When the electronic device 10 is electrically connected to the docking station 20, the docking station 20 is capable of synchronously displaying information (such as videos, picture, documents and music) that are displayed on the electronic device 10. The electronic device 10 includes a socket (not shown) designed for the insertion of a plug (not shown), such as an USB port.

Figure 2:
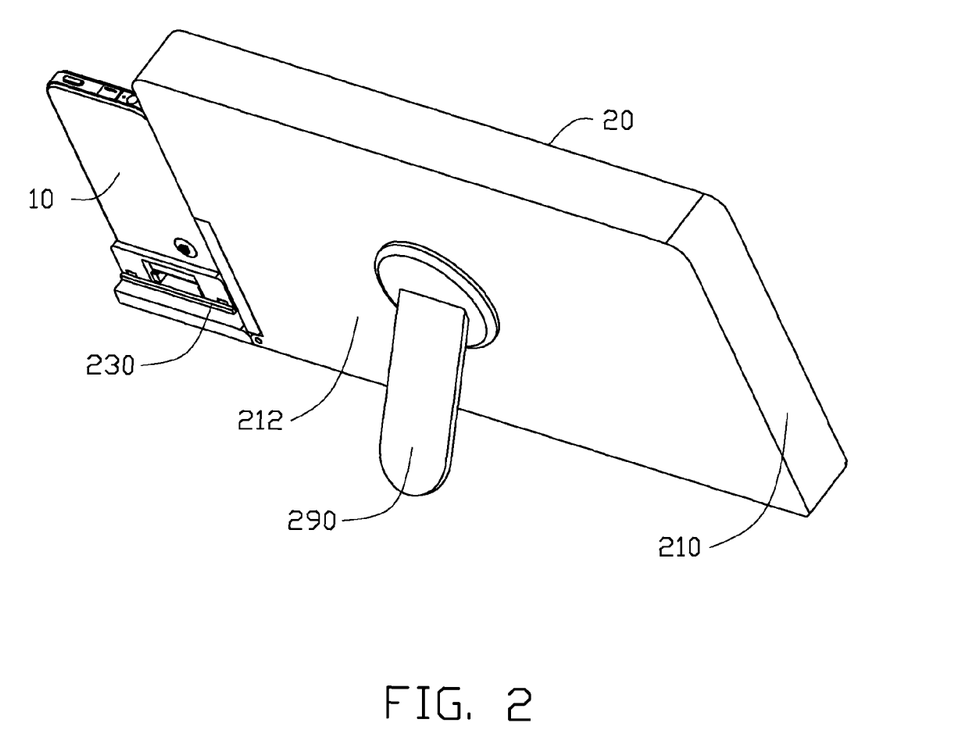
FIG. 2 is similar to FIG. 1, but viewed from another aspect.
Figure 3:
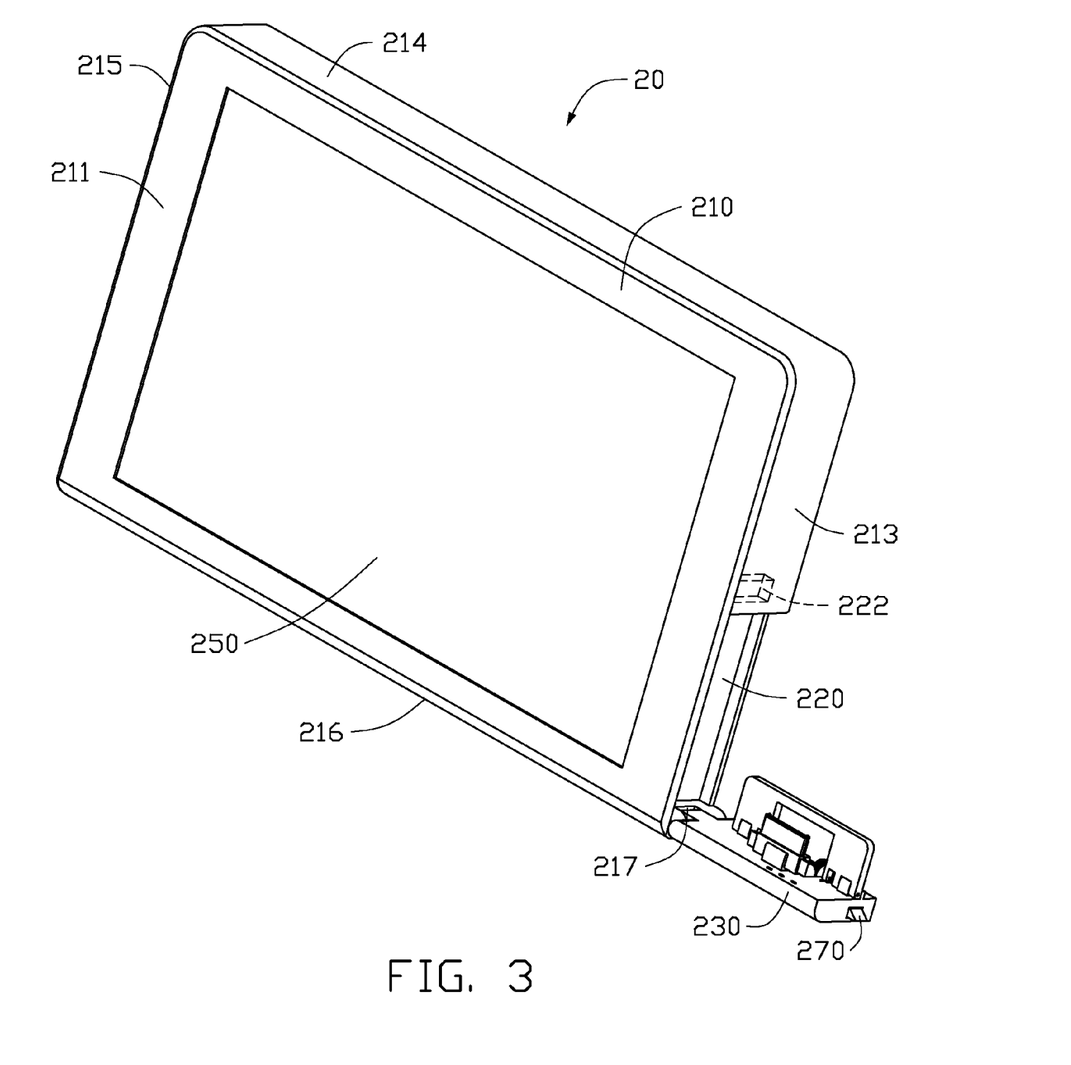
FIG. 3 is a perspective view of the docking station of FIG. 1 showing the interface mechanism unfolded.

Referring to FIGS. 2 and 3, the docking station 20 is substantially rectangular. The docking station 20 includes a main body 210, a connector mechanism 230 rotatably mounted to the main body 210, a second display 250 mounted to the main body 210, and a latching mechanism 270 for locking the connector mechanism 230 to the main body 210. The second display 250 is used to synchronously display information, such as videos, pictures, and documents that are displayed in the first display 110. The size of the second display 250 is greater than that of the first display 110, thus, the information displayed in the first display 110 is enlarged when being view from the second display 250. Furthermore, the docking station 20 includes a pair of speakers (not shown). The speakers are used to synchronously play sound signals from the electronic device 10. The docking station 20 also includes a stand 290 (see FIG. 2) for supporting the docking station 20 on a supporting surface (not shown), such as, a table.

The docking station 20 can be a single electronic device capable of operating independently when the electronic device 10 is detached, and the interface mechanism 230 acts as an interface port for electrically connecting a peripheral device.

The main body 210 includes a front cover 211, a rear cover 212 opposite to the front cover 211, and four sidewalls (hereinafter, a first sidewall 213, a second sidewall 214, a third sidewall 215 opposite to the first sidewall 213, and a fourth sidewall 216 opposite to the second sidewall 214). The front cover 211, the rear cover 212, and the sidewalls cooperatively define an accommodating space (not shown) for receiving the second display 250, the speakers, and other components. The front cover 211 defines a substantially rectangular opening 2110 (FIG. 1). The second display 250 is exposed out of the main body 210 via the opening 2110. The first sidewall 213 recesses toward the third sidewall 215 to define a receiving space 220. The receiving space 220 is adjacent to the second sidewall 216 and is used for receiving the connector mechanism 230 when the connector mechanism 230 is in a closed position relative to the main body 210. The joint of the first and second sidewalls 213, 216 defines a notch 217 communicating with the receiving space 220. Two axis holes 218 (see FIG. 5) are respectively defined at opposite sides of the notch 218. The first sidewall 213 further defines a recess 222 communicating with the receiving space 220. The recess 222 extends longitudinally in a direction opposite to the notch 217.

Figure 4:
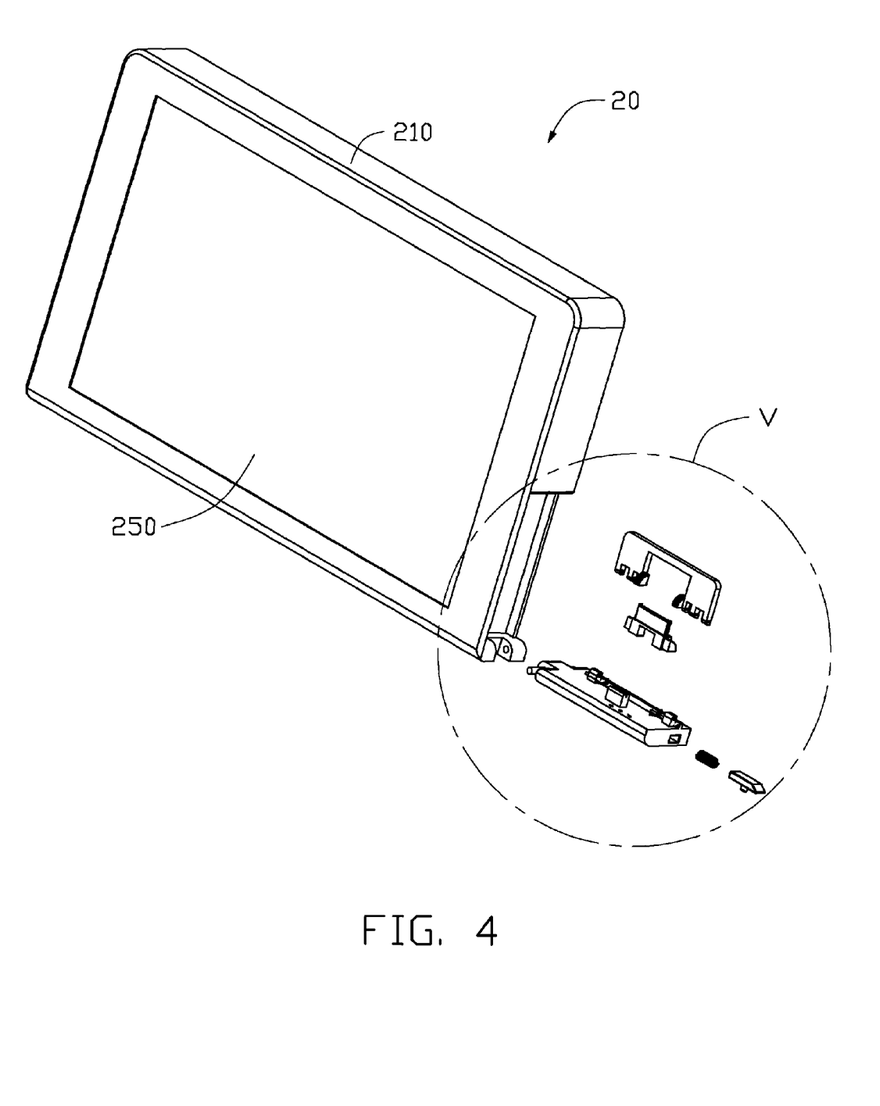
FIG. 4 is partially disassembled perspective view of the docking station in FIG. 3.
Figure 5:
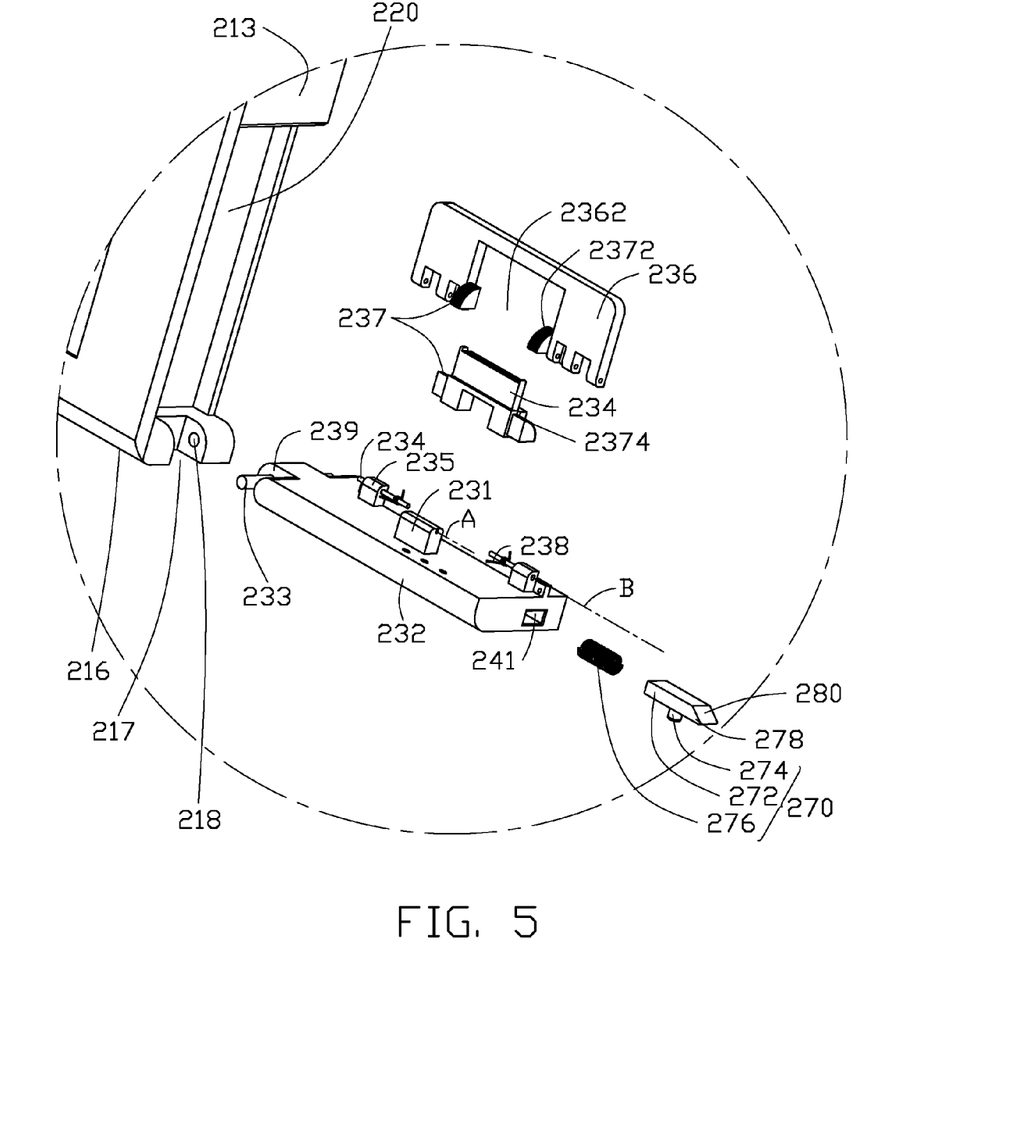
FIG. 5 is an enlarged partial view of portion V in FIG. 4.

Referring to FIGS. 4 and 5, the connector mechanism 230 includes a base 232 rotatably coupled to the main body 210, a shaft 233 fixed to an end of the base 232. An interface member 234 rotatably coupled to the base 232, a supporting member 236 rotatably coupled to the base 232, and a transmitting portion 237 for connecting the interface member 234 with the supporting member 236. The connector mechanism 230 is capable of rotating from a closed position allowing the connector to be received in the receiving space 220 to an open position allowing the interface 234 to be exposed to the outside. When the connector mechanism 230 rotates to the open position, the interface member 234 and the supporting member 236 rotate relative to the base 232 and are unfolded to support and electrically connect the electronic device 10.

The base 232 is rotatable to the main body 210 by the shaft 233 rotatably received in the axis holes 218. A first stand 231 and a pair of second stands 235 are arranged on the base 232 in a triangle. A protrusion 239 protrudes from an end of the base 232. The protrusion 239 defines a through hole (not labeled) for receiving the axis shaft 233. The other end of the base 232 opposite to the protrusion 239 defines a recess toward the protrusion 239 providing a receiving portion 241. The receiving portion 241 corresponds to the recess 222 when the base 232 is received in the receiving space 220. The receiving portion 241 is used for receiving the latching mechanism 270. A surface of the base 232 opposite to the first and second stands 231, 235 defines elongated hole 242. The elongated hole 242 communicates with the receiving portion 241.

The interface member 234 is rotatably coupled to the base 232 and is foldable. The interface member 234 is rotatable around a first axis A, and matches with the socket of the electronic device 10. The interface member 234 may be USB port, HDMI (High Definition Multimedia) port and is inserted into the socket of the electronic device 10, such that the electronic device 10 is electrically connected to the docking station 20. The interface member 234 is further electrically connected to the second display 250, the speakers, and other electronic component of the docking station 20, such that the electronic device 10 is electrically connected to the second display 250 and the speakers.

The supporting member 236 is substantially rectangular. The supporting member 236 is rotatably coupled to the base 232 and is foldable. The supporting member 236 is rotatable around a second axis B parallel to the first axis A. An end of the supporting member 236 coupled to the base 232 defines a cutout 2362. The cutout 2362 receives the interface member 234. The supporting member 236 is rotatably coupled to the base 232 by a pivoting rod 243 and is fixed to the second stand 235. The thickness of the supporting member 236 is substantially equal to that of the interface member 234.

The connector mechanism 230 further includes a pair of torsion springs 238, sleeved on the pivoting rod 243 with opposite ends respectively fastened to the supporting member 236 and the base 232, providing a force for rotating the supporting member 236 to keep an angle with the base 232. In the embodiment, when the torsion springs 238 are in a relaxed state, the supporting member 236 is perpendicular to the base 232 by virtue of the torsion springs 238.

The transmitting portion 237 connects the interface member 234 with the supporting member 236, such that when one of the interface member 234 and the supporting member 236 rotates in a first direction, the other one of the interface member 234 and the supporting member 236 synchronously rotates in a second direction reverse to the first direction. The transmitting portion 237 includes two first tooth portions 2372 and two second toothed portions 2374. The first toothed portions 2372 are respectively fixed to opposite sides of the cutout 2362, and the second toothed portions 2374 correspond to the first toothed portions 2372 and are respectively fixed to opposite end of the interface member 234. The first toothed portions 2372 respectively engage with the corresponding second toothed portions 2374.

The latching mechanism 270 includes a latching member 272 slidably received in the receiving portion 241, an operating member 274 protruding from the latching member 272, and an elastic element 276. The elastic element 276 and the latching member 272 are received in the receiving portion 241 in order, and the operating member 274 is slidably received in the elongated hole 242. The latching member 272 includes a hook portion 278. The hook portion 278 defines an inclined surface 280. The hook portion 278 is slidable into and out of the receiving portion 241, and is capable of being inserted into the recess 222. The elastic element 276 provides a force for driving the hook portion 278 to extend out of the receiving portion 241. The operating member 274 drives the latching member 272 to slide into the receiving portion 241, whereby the hook portion 278 slides into the receiving portion 241, and the connector mechanism 230 is unlocked from the main body 210.

In assembly, the torsion springs 238 sleeve on the pivoting rod 243, the transmitting member 237 connects the interface member 234 with the supporting member 236 by the first toothed portions 2372 engaging with the corresponding second toothed portions 2374. The interface member 234 and the supporting member 236 are rotatably coupled to the base 232, and the opposite end of the torsion springs 238 are respectively fastened to the base 232 and the supporting member 236. The elastic element 276 and the latching member 272 are received in the receiving portion 241 in order. The base 232 is rotatably coupled to the main body 210 by the axis shaft 233 rotatably received in the axis holes 218.

Again referring to FIG. 3, in use, to operate the latching mechanism 270 to unlock the connector mechanism 230 from the main body 210; the base 232 is rotated out of the receiving space 220 and stays on the same plane with the fourth sidewall 216. The supporting member 236 is unfolded and is perpendicular to the base 232 by virtue of the torsion springs 238. The interface member 234 connecting with the supporting member 236 by the transmitting member 237 is also unfolded and perpendicular to the base 232. Referring to FIGS. 1 and 2, the electronic device 10 is electrically connected to the docking station 20 by the interface member 234, and is further supported by the supporting member 236.

Figure 6:
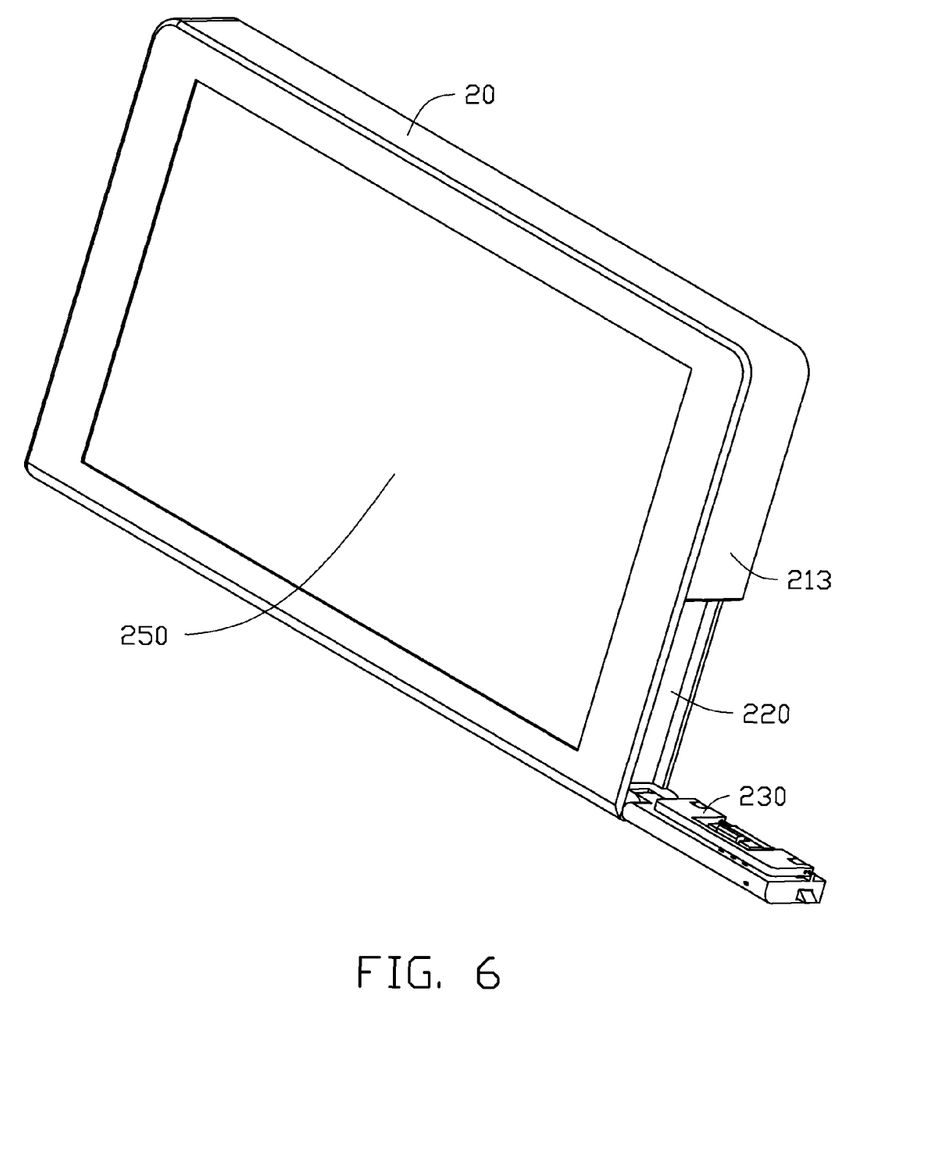
FIG. 6 is a perspective view of the docking station of FIG. 1 showing the interface mechanism being unfolded with the interface folded.
Figure 7:
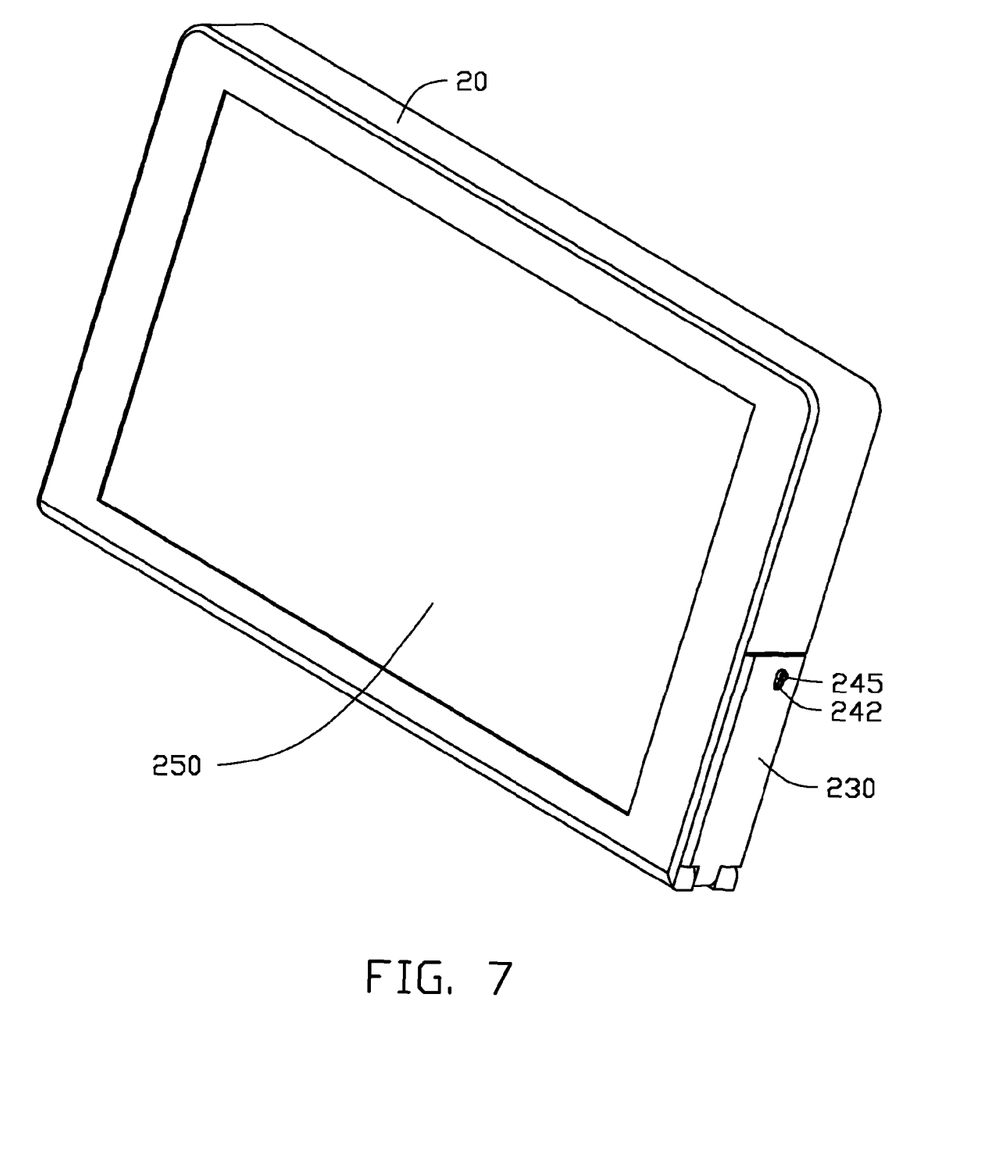
FIG. 7 is a perspective view of the docking station of FIG. 1 showing the interface mechanism being folded.

Referring to FIG. 6, when the docking station 20 is not being used, the electronic device 10 is detached from the docking station 20. The supporting member 236 is rotated anticlockwise and folded on the base 232, the interface member 234 is driven to rotate clockwise and is also folded on the base 232, at this time, the interface member 234 is received in the cutout 2362 of the supporting member 236. Referring to FIG. 7, then, the base 232 is rotated into the receiving space 220, and the connector mechanism 230 is locked to the main body 210 by the locking mechanism 270.

With assistance of the connector mechanism 230, the interface member 234 is capable of being hidden when the docking station 20 is not used, thus, protecting the interface member 234 from contamination.

Even though information and the advantages of the present embodiments have been set forth in the foregoing description, together with details of the structures and functions of the present embodiments, the disclosure is illustrative only; and changes may be made in detail, especially in matters of shape, size, and arrangement of parts within the principles of the present embodiments to the full extent indicated by the broad general meaning of the terms in which the appended claims are expressed.

What is claimed is:

1. A docking station for an electronic device, comprising:
  a main body defining a receiving space at a sidewall thereof; and
  a connector mechanism rotatably mounted to the main body and capable of being received in the receiving space when in a closed position relative to the main body, the connector mechanism comprising an interface for supporting the electronic device;
  wherein when the connector mechanism is received in the receiving space, the interface is hidden in receiving space; and
  wherein the connector mechanism comprises a base rotatably coupled to the main body, the interface is rotatably connected to and is foldable on the base; the connector mechanism further comprises a supporting member rotatably coupled to and foldable on the base, the supporting member is adapted for supporting the electronic device electrically connected to the interface.

2. The docking station of claim 1, wherein the connector mechanism further comprises a transmitting member for connecting the interface member with the supporting member, when one of the interface member and the supporting member rotates in a first direction, the transmitting member drives the other one of the interface member and the supporting member to synchronously rotate in a second direction reverse to the first direction.

3. The docking station of claim 2, wherein the transmitting portion comprises at least one first toothed member and at least one second toothed member engaging with the at least one first toothed member, the at least one first toothed member and the at least one second toothed member are respectively secured to the interface member and the supporting member.

4. The docking station of claim 1, wherein the supporting member defines a cut for receiving the interface member when the supporting member and the interface member are folded on the base.

5. The docking station of claim 1, wherein the connector mechanism further comprises at least one torsion spring, the at least one torsion spring is used for providing a force to keep the supporting member at an angle with the base.

6. The docking station of claim 5, wherein opposite ends of the at least one torsion spring are respectively fastened to the base and the supporting member, and the supporting member is perpendicular to the base when the at least one torsion spring is in an original state.

7. The docking station of claim 1, further comprising a latching mechanism, the latching mechanism configured for locking the connector mechanism to the main body.

8. The docking station of claim 1, wherein the electronic device comprises a first display, the docking station comprises a second display, and the size of the second display is larger than that of the first display.

9. The docking station of claim 8, wherein the second display is electrically connected to the interface member.

10. An electronic device capable of electrically connecting peripheral device, comprising:
a main body defining a receiving space at a sidewall thereof; and
a connector mechanism rotatably received in the receiving space and adapted to electrically connect peripheral device, the connector mechanism capable of rotating from a closed position being exposed out of the receiving space to an open position being hidden in the receiving space;
wherein the connector mechanism comprises a base rotatably received in the receiving space, and an interface member rotatably coupled to and foldable on the base, when the connector mechanism rotates to the open position, the interface member is unfolded to electrically connect peripheral device, and when the connector mechanism rotates to the closed position, the interface member is folded; wherein the connector mechanism further comprises a supporting member and a transmitting member, the supporting member is rotatable coupled to the base and is configured to support the peripheral device, the transmitting member connects the interface member with the supporting member, when one of the interface member and the supporting member rotates in a first direction, the other one of the interface member and the supporting member is driven to synchronously rotate in a second direction reverse to the first direction.

11. The electronic device of claim 10, wherein the connector mechanism further comprises at least one torsion spring, the at least one torsion spring is used for providing a force to keep the supporting member at an angle with the base.

12. The electronic device of claim 11, wherein opposite ends of the at least one torsion spring are respectively fastened to the base and the supporting member, and the supporting member is perpendicular to the base when the at least one torsion spring is in an original state.

13. The electronic device of claim 10, wherein the transmitting portion comprises at least one first toothed member and at least one second toothed member engaging with the at least one first toothed member, the at least one first toothed member and the at least one second toothed member are respectively secured to the interface member and the supporting member.

14. The electronic device of claim 10, wherein the supporting member defines a cut for receiving the interface member when the supporting member and the interface member are folded on the base.

15. The electronic device of claim 10, further comprising a latching mechanism, the latching mechanism configured for locking the connector mechanism to the main body.

16. The electronic device of claim 10, wherein the main body comprises a display unit electrically connected to the interface.

* * * * *